United States Patent

Springett

[15] 3,700,812

[45] Oct. 24, 1972

[54] AUDIO SYSTEM WITH MEANS FOR REDUCING NOISE EFFECTS

[72] Inventor: James C. Springett, La Canada, Calif.

[73] Assignee: The United States of America as represented by the Administrator of the National Aeronautics and Space Administration

[22] Filed: March 11, 1971

[21] Appl. No.: 123,253

[52] U.S. Cl. ....................179/1 P, 325/473, 325/480

[51] Int. Cl. ............................................H04b 15/00

[58] Field of Search.........179/1 P, 15.55 T; 325/473, 325/474, 475, 476, 478, 323, 324, 480

[56] References Cited

UNITED STATES PATENTS

| | | | |
|---|---|---|---|
| 2,173,925 | 9/1939 | Tüxen | 179/1 P |
| 3,180,936 | 4/1965 | Schroeder | 179/1 P |
| 3,462,691 | 8/1969 | McDonald | 325/475 |

*Primary Examiner*—Kathleen H. Claffy
*Assistant Examiner*—Horst F. Brauner
*Attorney*—John R. Manning, Monte F. Mott and Paul F. McCaul

[57] ABSTRACT

A system for eliminating noise pulses in the waveform of an audio signal is disclosed. The audio signal is used to produce an envelope signal whose amplitude is a function of the amplitude of a waveform section received during a time period T. The amplitude of the center segment of the waveform section is compared with the envelope signal amplitude. If the former is greater than the envelope signal amplitude it represents a noise pulse, and it is substituted by a pulse whose amplitude is either the envelope signal amplitude or the amplitude of a waveform segment adjacent to the noise representing segment.

17 Claims, 5 Drawing Figures

INVENTOR.
JAMES C. SPRINGETT
BY
Lindenberg, Freilich & Wasserman
ATTORNEYS

PATENTED OCT 24 1972 3,700,812

SHEET 2 OF 3

JAMES C. SPRINGETT
*INVENTOR.*

BY Lindenberg, Freilich & Wasserman

ATTORNEYS

JAMES C. SPRINGETT
*INVENTOR.*

BY
Lindenberg, Freilich & Wasserman
ATTORNEYS

AUDIO SYSTEM WITH MEANS FOR REDUCING NOISE EFFECTS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to audio equipment and, more particularly, for a system for removing impulse noise from audio signals.

2. Description of the Prior Art

Impulse noise is typically present in audio systems designed to reproduce sound, such as music. For example, in reproducing sound, such as music, from vinyl records,noise, due to dust, dirt and particularly scratches on the disc surface, is generally produced along with the originally recorded music. Similar noise is present in systems in which the sound is reproduced from tapes, or in mobile sound systems such as automobile radios. In the latter, the underlying noise cause is due to ignition sparks.

The noise which may be additive or multiplicative, is characterized by narrow width, high amplitude pulses, which occur in an aperiodic manner and at a relatively low frequency as compared with the reciprocal of the pulse period. The noise is highly objectionable from the standpoint of the listener since it manifests itself in the form of annoying audible pops and scratching sounds.

A number of systems have been devised to eliminate such unwanted noise from musical recordings. The simplest and least successful approach inserts a lowpass type of electrical filter in the audio amplification system. The effect of such a filter is to eliminate the very high frequency components of the noise pulses, which in effect lowers the rise and fall-time of the pulse, replacing the sharp 'popping' sound with one that is mellower but still present and distinctly audible. Not only does the filter remove high frequency components of the noise, but also those associated with the desired sound, which in the case of music is very undesirable. Extensions of this basic technique operate to restrict bandwidth by using combinations of filters which cut off high frequency reproduction in varying degrees of sophistication. Another recently developed system divides the musical reproduction into four frequency segments and varies the bandwidth of each of the segments in accordance with the needs of the material being recorded or being reproduced. Bandwidth is manipulated so that it is never wider than that needed for adequate reproduction of the segment.

Another approach to noise reduction places a peak-limiter or 'clipper' circuit in the audio amplifier. Such circuits are intended to limit amplitude peaks of the noise pulses and thereby render the noise less audible. However, they also limit the dynamic range of the music, and as a result cause distortion during loud passages and unfortunately have little effect during quiet passages. An improvement on this technique makes use of a threshold detector which alters the clipping level in accordance with the loudness of the music. Such an approach is effective but does not eliminate the presence of the noise entirely.

Thus, a need exists for a new system for the removal of noise from reproduced audio signals. Preferably, in such a new system the removal of the noise pulses should be accomplished without distortion of the reproduced sound, if noise pulses are present. In case a noise pulse is present, its removal should be accomplished so that its presence does not produce annoying audible pops or scratchy sounds.

OBJECTS AND SUMMARY OF THE INVENTION

The primary object of the present invention is to provide a new noise removal system.

Another object of the present invention is to provide a new noise removal system in which the removal of the noise pulses does not result in distortion of the reproduced sound.

Still a further object of the present invention is to provide a system in which noise pulses are removed to eliminate the production of annoying acratchy sounds without affecting the signal characteristics or the fidelity of the reproduced sound.

These and other objects of the invention are achieved by providing a system which is supplied with the electrical signal or waveform, representing the desired sound to be reproduced. Such signal or waveform may include one or more noise pulses, which the present system is directed to remove. The system converts the entire waveform into a succession of pulses whose amplitudes and polarities represent the waveform. In operation, for the last received N pulses an envelope is provided. The envelope amplitude is related to the aggregate amplitudes of the N pulses. The envelope amplitude is compared with the amplitude of the center pulse of the N pulses. If the amplitude of the latter is less than the envelope amplitude, the compared pulse with its amplitude and polarity are supplied to an output lowpass filter. However, if the amplitude of the compared pulse exceeds the envelope amplitude, the lowpass filter is provided with a pulse whose polarity is the same as that of the compared pulse, but with an amplitude which is equal to the scaled envelope amplitude, rather than with the amplitude of the compared pulse. The lowpass filter in essence converts the pulses to a continuous electrical signal whose waveform corresponds to the polarity and amplitude pulses which are supplied to it. It is the latter electrical waveform which is supplied to the audio amplifier of any conventional sound reproduction system.

Thus, in the absence of any noise pulse, each pulse produced in response to the input waveform is supplied to the lowpass filter, whose output is an exact reproduction of the input waveform, and therefore, no sound distortion is produced. However, in the presence of a noise pulse, represented by a pulse whose amplitude is greater than the amplitude of the envelope, such a noise pulse is inhibited from being supplied to the lowpass filter. In its place a pulse having an amplitude corresponding to the scaled envelope amplitude is supplied to the filter. The amplitude of such a pulse is most like the amplitudes of adjacent pulses representing the original sound to be reproduced. Thus, the noise pulse is removed by replacing it with a segment of electrical waveform which is most like the music waveform at the time when the noise pulse occurs.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
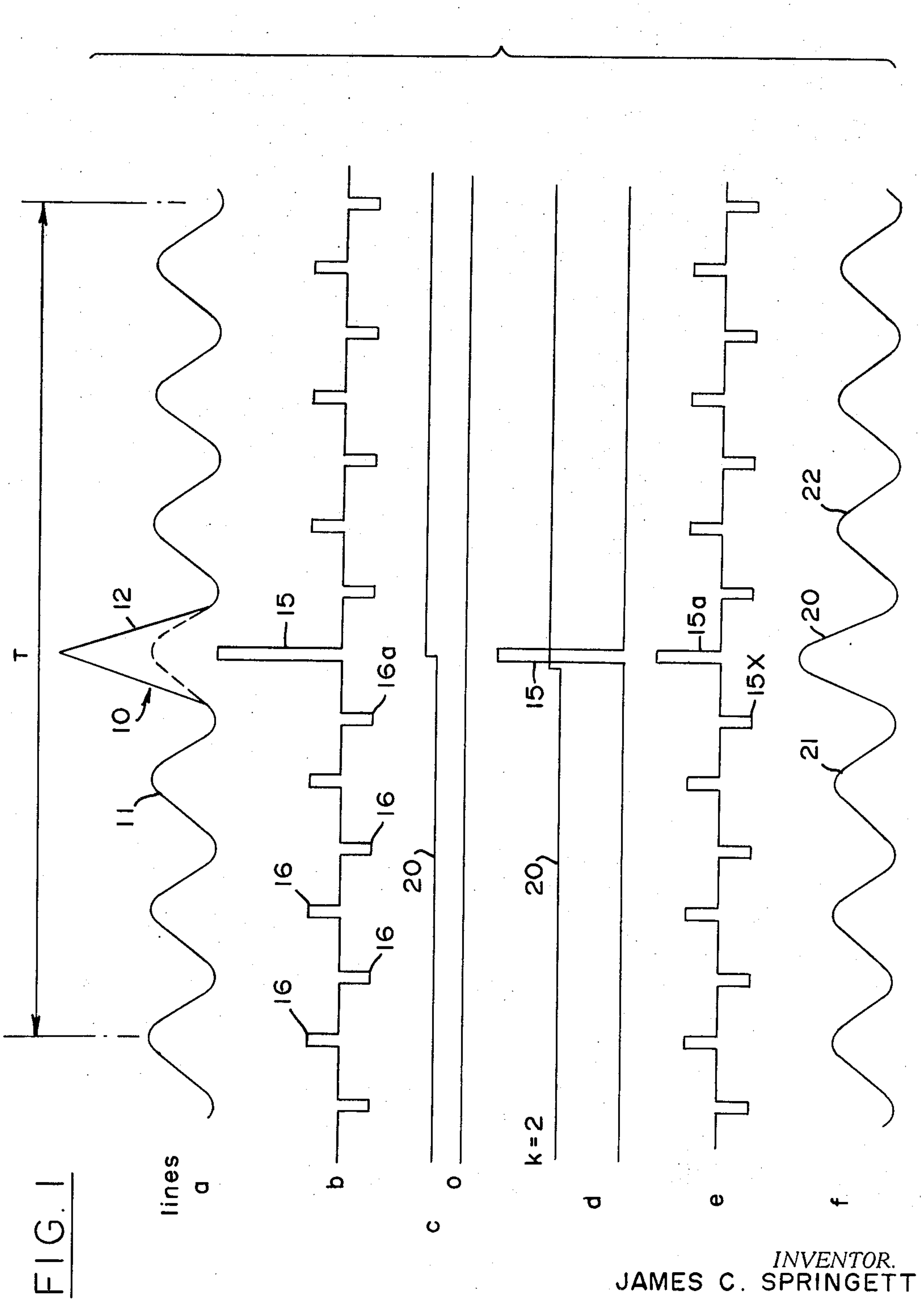
FIG. 1 is a multiline waveform diagram useful in explaining the basic principles of the present invention.

The teachings of the present invention may best be explained in connection with FIG. 1. Therein, line *a* is a representation of an electrical signal 10 with a sine function waveform 11, which is assumed to represent a recorded sound which is to be reproduced. Superimposed on the waveform 11 is a noise pulse 12. When such a signal is reproduced, a scratchy sound or annoying pop occurs at the location of the noise pulse 12. As shown in line *b*, in accordance with the present invention, the signal 10 is converted into a succession of pulses, whose polarities and amplitudes are representative of signal 10. Except for pulse 15 whose polarity and amplitude correspond to noise impulse 12, all the other pulses 16 are of equal amplitude since they represent the sine function waveform 11.

Alternately stated, the signal 10 is sampled at a fixed rate which is generally twice the highest frequency of the signal content, thereby producing pulses 16 and pulse 15. As these pulses are produced an envelope signal, representing an envelope function, is formed for the last N received pulses which are assumed to be received during a period T. The amplitude of the envelope signal, designated by numeral 20 in line *c*, is directly related to the absolute value of the amplitudes of the N pulses. In FIG. 1, line *c*, the amplitude of the envelope signal 20 is shown equal to the sum of the amplitudes of the N pulses divided by N. Defining the sum of all the averages as Ej and the amplitude of the envelope signal 20 by $A_{ES}$, $$A_{ES}=(k/N)(Ej).$$

The factor scaling $k$ is generally greater than 1.

In accordance with the present invention each amplitude $A_{ES}$, which is a function of the amplitudes of $N$ successive pulses, is compared with the amplitude of the center pulse of the N pulses. If the amplitude of the center pulse is not greater than $A_{ES}$ than the center pulse, with its amplitude and polarity, is directed to an output lowpass filter. If however, the amplitude of the center pulse is greater than $A_{ES}$, the amplitude $A_{ES}$ (modified perhaps by an additional scaling factor) and the polarity of the center pulse are supplied to the filter.

Thus, at any point in time the maximum pulse amplitude which is supplied to the filter is never greater than $A_{ES}$. The filter in essence converts the pulses supplied thereto into a continuous AC waveform which is identical with the waveform of signal 10 except that the noise pulse 12 is replaced by a pulse which is not greater than $A_{ES}$, and which is a function of the amplitudes of adjacent signals. Therefore, when the output signal of the filter is converted into a sound, the noise pulse is replaced by a waveform segment which is most like the adjacent waveform.

In FIG. 1, line *c*, the amplitude of $$A_{ES} \text{ is } (1/N)(Ej)$$

while in line *d*, $k$=2. Line *e* represents the pulses supplied to the output lowpass filter and line *f* represents its output. From line *c*, it is seen that since the amplitude of pulse 15 is greater than $A_{ES}$, the pulse 15*a* which is supplied to the filter has an amplitude equal to $A_{ES}$ rather than to pulse 15. Consequently, the amplitude of the waveform segment 20 (see line *f*) provided by the filter which corresponds to pulse 15*a* has an amplitude which is more closely equal to that of the adjacent waveform segments 21 and 22 than the amplitude of pulse 15 or pulse noise 12. As a result, the presence of the noise is eliminated since the difference in the amplitudes of segment 20 and adjacent segments 21 and 22 is generally not noticeable to the listener.

The basic principles of the present invention may be practiced with a system with either analog or digital circuits. For example, the analog pulses, shown in FIG. 1, line *b*, may be converted into numbers which can then be added to provide a number representing the envelope signal amplitude. This number is then compared with the number representing the center pulse, such as pulse 15. The numbers representing the pulses shown in line *e*, are then converted into analog signals which are supplied to the output lowpass filter whose output is the reconstructed waveform shown in line *f*. An example of such a system will be described hereafter in conjunction with FIG. 2. On the other hand, the original waveform 10 may be supplied to a system operating in the analog domain to produce the desired reconstructed waveform. An example of such an embodiment will be described hereafter in conjunction with FIG. 3.

Figure 2:
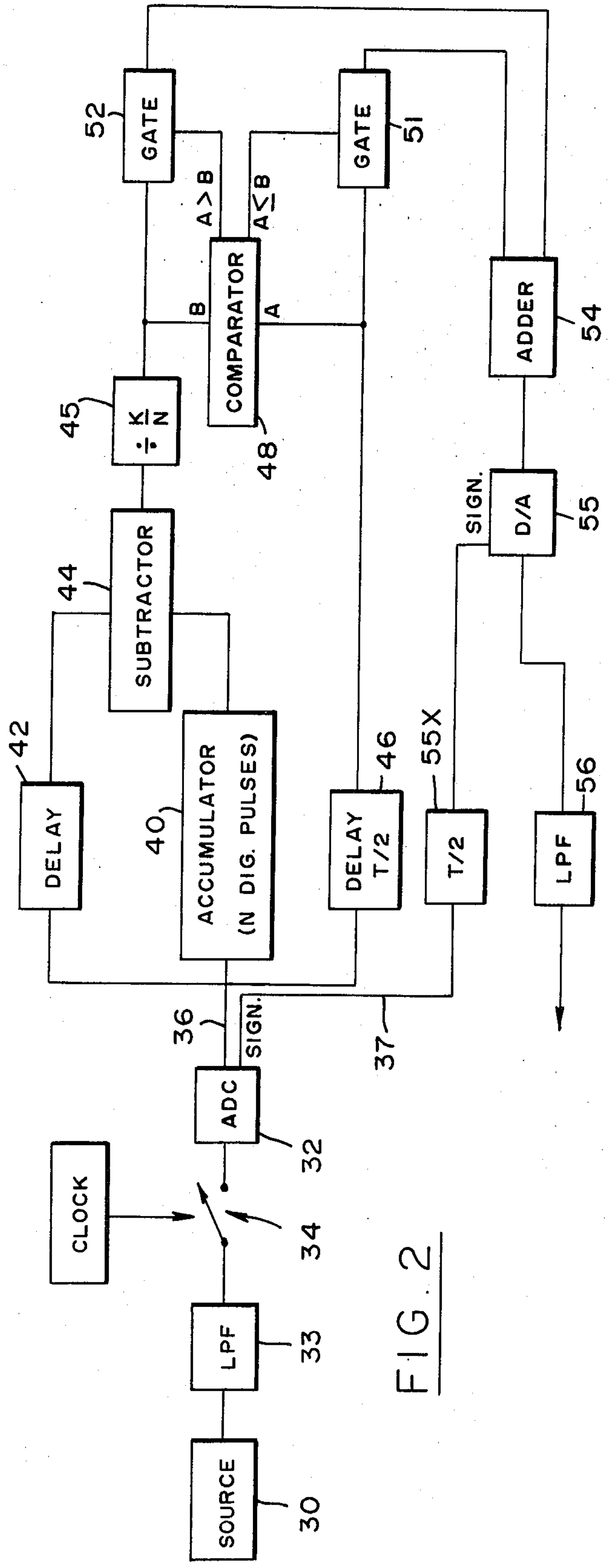
FIG. 2 and FIG. 3 are block diagrams of two different embodiments of the invention.

As shown in FIG. 2, a source 30 is connected to an analog-to-digital converter (ADC) 32 through an input lowpass filter 33 and a sampler in the form of a two-position switch controlled by a clock 35. Source 30 is the one providing the electrical signal which may be filtered by filter 33 to provide as an output the signal 10 shown in line *a* of FIG. 1. The sampler is controlled by clock 35 to switch between its two positions to provide analog pulses, such as those shown in line *b* of FIG. 1, to the ADC 32. Typically, the frequency of the pulses is at least twice the bandwidth of the filter 33.

The amplitude of each analog pulse supplied to the ADC 32 is converted into a multibit number on line 36 and a sign bit on line 37. Each number is supplied to an accumulator 40 and to a delay unit 42. Unit 42 provides a delay of T units of time during which N pulses, for which an envelope signal is to be produced, are received by ADC 32. The output of the delay unit 42 is subtracted from the output of accumulator 40 by a subtractor 44 whose output is a number representing the numerical sum of the last N accumulated numbers. The output of subtractor 44 is divided by $N/k$ in a divider 45 whose output number, designated B, represents the envelope signal. This number is equal to the average of the last $N$ received numbers when $k$=1. When $k$ is other than 1, the number is a function of the last N-received numbers.

Each number on line 36 is delayed by a delay unit 46 of $T/2$ whose output number, designated A, is supplied to a comparator 48 to which the B number is also supplied. It should be apparent that the A number represents the amplitude of the center pulse of the last N received pulses during the period T, while the B number is a function of the amplitudes of the last N-received pulses.

The A and B numbers are also supplied to gates 51 and 52 respectively, whose outputs are supplied to an adder 54. Gate 51 is enabled whenever $A \leq B$ thereby supplying the center pulse number $A$ to the adder 54, while gate 52 is enabled whenever $A>B$ so that the envelope signal number $A$ is supplied to the adder. Since during each cycle of operation only one of the gates is open, the adder's output is either the $A$ or the $B$ number, which is supplied to a digital-to-analog converter (DAC) 55, which is also supplied with the sign bit of the center pulse polarity, which is delayed by a delay unit 55$x$. Thus, the DAC 55 supplies an analog output pulse which has the polarity of the center pulse. However, the amplitude of the pulse is either that of the center pulse when $A \leq B$ or is equal to the amplitude of the envelope signal, as represented by the number $B$. The output of DAC 55 is shown in FIG. 1, line $e$. This output is then filtered by an output lowpass filter 56 whose output is the reconstructed waveform shown in FIG. 1, line $f$.

Figure 3:
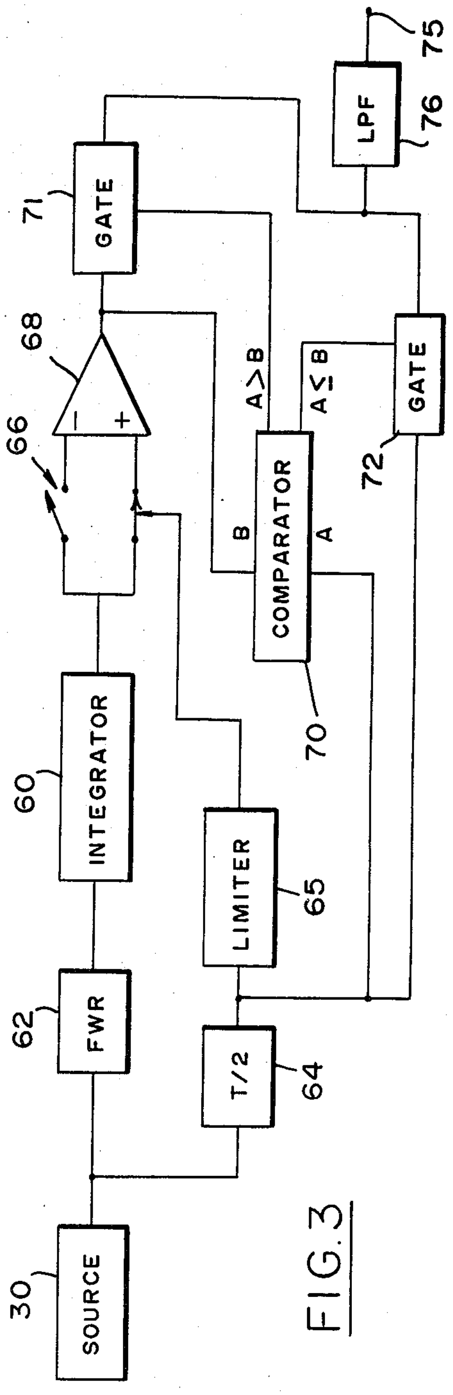

Reference is now made to FIG. 3 wherein an arrangement is shown for performing the basic teachings of the invention in the analog domain. Therein, the output of source 30 is continually supplied to an integrator 60 through a full wave rectifier 62. The integrator 60 has a time constant T and an adjustable gain. Thus, its output amplitude is a function of the amplitude of the waveform supplied thereto during the last T period. Alternately stated, the amplitude of the integrator output represents the envelope signal amplitude. In essence the integrator 60 performs the same function as accumulator 40, delay line 42 and subtractor 44 which operate in the digital domain.

The arrangement shown in FIG. 3 includes an analog $T/2$ delay line 64. Its output represents the center portion of the waveform integrated in 60. The polarity of the output of delay line 64 is detected by a limiter 65 whose output controls by means of switches 66 the input terminal of a differential amplifier 68 to which the integrator output is applied. Thus, the output of amplifier 68 has the amplitude of the envelope signal and the polarity of the center portion of the integrated waveform. This output, designated B, is supplied to a comparator 70 to which the center portion of the integrated waveform, which corresponds to number A in FIG. 2 is also supplied.

The outputs of amplifier 68 and delay line 64 are also connected to gates 71 and 72 respectively, whose outputs are connected to an output terminal 75, preferably through a lowpass filter 76. Thus, when $A \leq B$, i.e., the amplitude of the center portion of the waveform is not greater than the envelope signal amplitude, the center portion passes to the output terminal 75 through gate 72 and LPF 76. However, if the amplitude of the center portion of the waveform, such as a noise pulse, exceeds the envelope signal, i.e., $A>B$, gate 71 is opened and a signal with the envelope signal amplitude but with the polarity of the center portion of the waveform passes to the output terminal 75.

Herebefore it was assumed that a noise pulse, represented by a pulse whose amplitude exceeds the envelope signal amplitude, is replaced in the final waveform by a segment whose amplitude equals the envelope signal amplitude. Such a technique represents only one way of minimizing the effect of the noise pulse. If desired, the noise pulse when detected may be replaced by a preceding pulse which is part of the actual music which is to be reproduced. For example, if desired pulse 15, shown in FIG. 1, line $b$, may be replaced by the preceding pulse 15$x$ (see line $e$) rather than by pulse 15$a$, whose amplitude equals the envelope signal amplitude. The replacement of the noise pulse by a preceding music-representing pulse may be particularly desirable if the electrical signal with the music waveform contains a succession of noise pulses.

Figure 4:
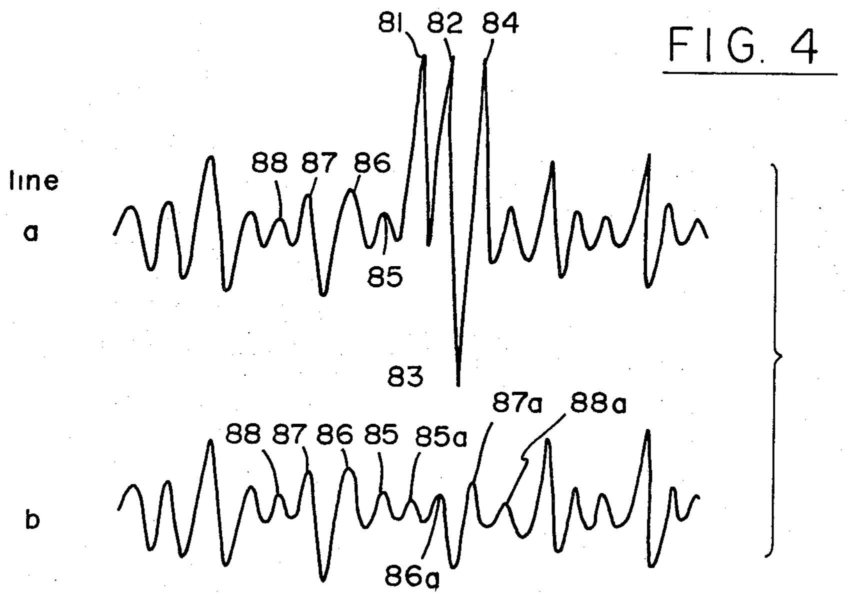
FIG. 4 is a multiline diagram useful in explaining another embodiment of the invention.

This aspect of the invention may better be explained in conjunction with FIG. 4, in which line $a$ represents a music waveform with several successive noise pulses 81–84. In such a case it may be desirable to replace these four noise pulses with four preceding waveform segments designated in line $a$ by 85–88. The final waveform will be as shown in line b wherein the replaced noise pulses are represented by waveform segments 85$a$–88$a$. By substituting the noise pulses with preceding music, the chances of any disturbing effect is completely eliminated.

The replacement of noise pulses with preceding music segments may be easily accomplished, particularly in the system shown in FIG. 2, which operates in the digital domain. Therein, the numbers corresponding to the preceding music segments are present in the delay unit 42. By making unit 42 a tapped delay line preceding music segments may be removed therefrom.

Figure 5:
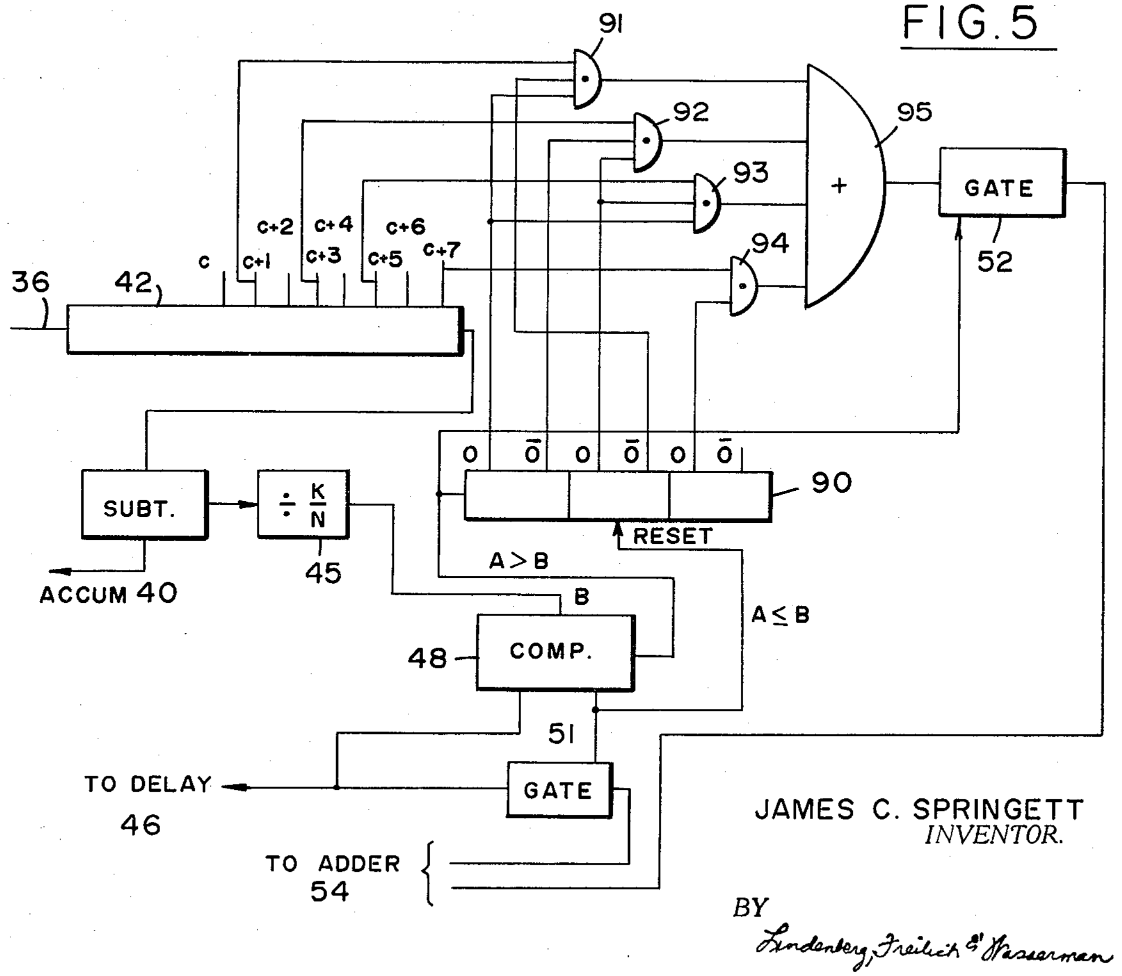
FIG. 5 is a partial block diagram of another embodiment of the invention.

Such a tapped delay line is shown in FIG. 5. The line is shown with a center tap C, and succeeding taps $C+1$, $C+2$, etc. It is appreciated that when the amplitude of pulse 81 is interrogated, its amplitude number is at the center of the line, i.e., is available at tap C. Segment 85 is available at tap $C+1$, segment 86 at $C+2$, etc. Thus, if desired, pulse 81 may be replaced by segment 85 by connecting tap $C+1$ to gate 52 rather than the output of divider 45. One cycle later segment 85 is at tap $C+2$ and segment 86 is at tap $C+3$. Thus, when the succeeding pulse 82 is detected, i.e., the output $A>B$ of comparator 48 is true, segment 86 at $C+3$ is supplied to gate 52.

As shown in FIG. 5, the output $A>B$ of comparator 48 may be used to increment the count in a counter 90, which is reset when the $A \leq B$ output of comparator 48 is true. The assertion (O) and negation ($\overline{O}$) outputs of each counter stage may be used to control logic circuitry in the form of AND and OR gates in order to control which segment from delay unit 42 is supplied to the gate 52. In FIG. 5, counter 90 is shown consisting of three stages sufficient to count up to seven successive noise pulses. AND gates 91–94 and OR gate 95 are sufficient to control the supply of one of four segments to the gate 52.

The arrangement in FIG. 5 is sufficient to substitute a preceding music segment for each of four successive noise pulses. In this arrangement, the music segment is substituted with the noise pulse polarity. If desired, delay line 55*x* may be replaced by a tapped delay line of T period and controlled so that when no substitution is required, the sign bit at the center tap is fed to DAC 55 and the sign of a preceding music segment from another tap is fed to the DAC 55 when the music segment is substituted for a noise pulse.

It is thus seen that in accordance with the present invention, the waveform of an audio signal is used to produce an envelope signal whose amplitude is a function of the last received waveform section, such as the one received during the last T period. The amplitude of the center segment of the waveform section is compared with the envelope signal amplitude. If the former is the smaller of the two, the center segment is passed unaltered for waveform reproduction. If however, the center segment amplitude exceeds the envelope signal amplitude, i.e., the center segment represents a noise pulse, it is substituted by a waveform segment which is at least a function of the waveform amplitude adjacent the center segment. In several embodiments the substituted waveform amplitude is the envelope signal amplitude, while in the embodiment of FIG. 5, it is the preceding waveform segment or segments. Clearly, if desired the following waveform segments or a combination of the preceding and following waveform segments may be substituted for the noise pulses.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A system for reducing the effect of noise-producing signals contained among audio signals, which represent recorded sound, comprising:

first means for receiving a sequence of said audio signals including said noise-producing signals;

second means for generating an envelope signal whose amplitude is a function of the amplitudes of a succession of N signals, last received by said first means, N representing a preselected integer;

third means coupled to said second means and responsive to each received signal and including comparing means for comparing a preselected amplitude which is a function of said envelope signal with the amplitude of the center signal in the succession of said N signals, and for providing a first control signal when said preselected amplitude is less than said center signal amplitude and a second control signal when said preselected amplitude is not less than said center signal amplitude; and output means coupled to said second and third means and including gating means for receiving each center signal when said second control signal is provided and for receiving a substitute signal when said first control signal is provided, said substitute signal amplitude being a function of at least the amplitude of a signal adjacent said center signal in said succession of N signals.

2. The arrangement as recited in claim 1 wherein said substitute signal amplitude is a function of said envelope signal amplitude.

3. The arrangement as recited in claim 1 wherein said substitute signal amplitude is substantially equal to the amplitude of an audio signal adjacent said center signal, said adjacent audio signal having an amplitude which is not greater than the amplitude of said envelope signal.

4. The arrangement as recited in claim 3 wherein said adjacent audio signal precedes in said succession of N signals said center signal, whose amplitude exceeds said envelope signal amplitude.

5. The arrangement as recited in claim 1 wherein said system further includes means for sensing a sequence of noise producing signals each with an amplitude which exceeds said preselected amplitude with which its amplitude is compared, said system further including means in said output means for receiving for each of said noise-producing signals a signal whose amplitude is a function of the amplitude of a different adjacent signal in said succession of N signals.

6. The arrangement as recited in claim 5 wherein each noise-producing signal is substituted with a signal whose amplitude equals a different preceding signal in said succession of N signals.

7. The arrangement as recited in claim 1 wherein said preselected amplitude is equal to the envelope signal amplitude divided by a factor which is not less than one.

8. The arrangement as recited in claim 7 wherein said substitute signal amplitude is a function of said envelope signal amplitude.

9. The arrangement as recited in claim 7 wherein said substitute signal amplitude is substantially equal to the amplitude of an audio signal adjacent said center signal, said adjacent audio signal having an amplitude which is not greater than the amplitude of said envelope signal.

10. The arrangement as recited in claim 9 wherein said adjacent audio signal precedes in said succession of N signals said center signal, whose amplitude exceeds said envelope signal amplitude.

11. The arrangement as recited in claim 7 wherein said system further includes means for sensing a sequence of noise-producing signals each with an amplitude which exceeds said preselected amplitude with which its amplitude is compared, said system further including means in said output means for receiving for each of said noise-producing signals a signal whose amplitude is a function of the amplitude of a different adjacent signal in said succession of N signals.

12. An audio system to which a continuous signal in the audible range is applied, the system comprising:

first means for receiving said continuous signal in the audible range and for producing a succession of equal duration pulses at a preselected frequency, each pulse having an amplitude and polarity which are a function of the amplitude and polarity of a corresponding section of said continuous signal;

second means coupled to said first means and responsive to said pulses for generating an envelope signal whose amplitude is a function of the amplitudes of the last N received pulses from said first means, N representing a preselected integer;

third means coupled to said first and second means and including comparing means for comparing the amplitude of the center pulse in the succession of said N pulses with a scaled amplitude which is a function of the amplitude of said envelope signal, and for providing a first control signal when said scaled amplitude is less than said center pulse amplitude and a second control signal when said scaled amplitude is not less than said center pulse amplitude; and output means coupled to said second and third means and including gating means for receiving each center pulse when said second control signal is provided and for receiving a substitute pulse when said first control signal is provided, said substitute pulse amplitude being a function of at least the amplitude of a pulse adjacent said center pulse in said succession of N pulses.

13. The arrangement as recited in claim 12 wherein said substitute pulse amplitude is a function of said envelope signal amplitude.

14. The arrangement as recited in claim 12 wherein said substitute pulse amplitude is substantially equal to the amplitude of a pulse adjacent said center pulse, when said adjacent pulse has an amplitude which is not greater than said scaled amplitude.

15. A method of reducing the effect of noise-producing signals contained among audio signals, which represent recorded sound, the steps comprising:

receiving a sequence of said audio signals including said noise-producing signals;

generating an envelope signal whose amplitude is a function of the amplitudes of a succession of N signals, last received by said first means, N representing a preselected integer;

comparing a preselected amplitude which is a function of said envelope signal with the amplitude of the center signal in the succession of said N signals;

providing a first control signal when said preselected amplitude is less than said center signal amplitude and a second control signal when said preselected amplitude is not less than said center signal amplitude; and receiving each center signal when said second control signal is provided and a substitute signal when said first control signal is provided, said substitute signal amplitude being a function of at least the amplitude of a signal adjacent said center signal in said succession of N signals.

16. The method as recited in claim 15 wherein said substitute signal amplitude is a function of said envelope signal amplitude.

17. The method as recited in claim 15 wherein said substitute signal amplitude is substantially equal to the amplitude of an audio signal adjacent said center signal, said adjacent audio signal having an amplitude which is not greater than the amplitude of said envelope signal.

* * * * *